INVENTOR
George F. Tagg.

Patented June 22, 1948

2,443,668

UNITED STATES PATENT OFFICE 2,443,668

SPEED INDICATOR

George Frank Tagg, Stafford, England, assignor to The English Electric Company Limited, London, England, a British company Application February 25, 1944, Serial No. 523,956
In Great Britain March 1, 1943

1 Claim. (Cl. 175—183)

This invention relates to an improved electrical device for giving a remote indication of speed, the object of the invention being to provide a device which can be designed to require little or no driving torque from the device of which the speed is being measured and which permits the remote indicator to be operated by the transmission over pilot wires of an extremely small amount of electrical power.

The invention can be used not only for the indication of speed but also for the remote indication of certain other quantities by being used to give an indication dependent on the speed of an integrating meter.

The device according to the invention utilizes an alternating or a periodically fluctuating or periodically intermittent electric current the frequency of which is proportional to the speed to be indicated and which is applied to a frequency meter.

One known type of frequency indicator utilizes the fact that a highly reactive electric circuit and a substantially non-reactive circuit when both are supplied with alternating or periodically fluctuating or periodically intermittent current at the same voltage and frequency will carry currents the ratio of which will vary with changes in the common frequency. The same is true of two circuits one of which has a high inductance and the other a high capacity.

Two parallel connected circuits as set forth in the preceding paragraph in combination with a D. C. ratiometer, one coil of this ratiometer and a rectifier being in series with one circuit and the other coil of the ratiometer and another rectifier being in series with the other circuit, constitutes a frequency ratiometer.

The present invention consists broadly in the combination of a synchronous means for generating periodic current in combination with a frequency ratiometer to which this periodic current is applied and which is calibrated in accordance with the speed to be indicated.

Figure 1:
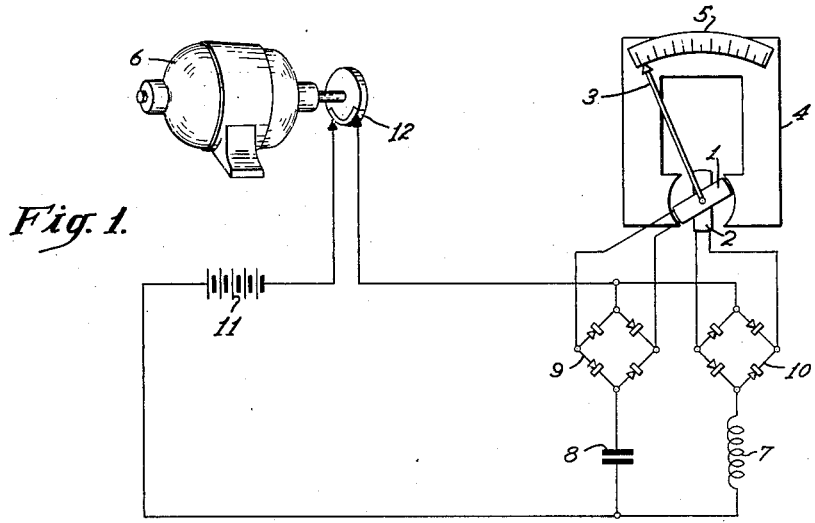
Figure 2:
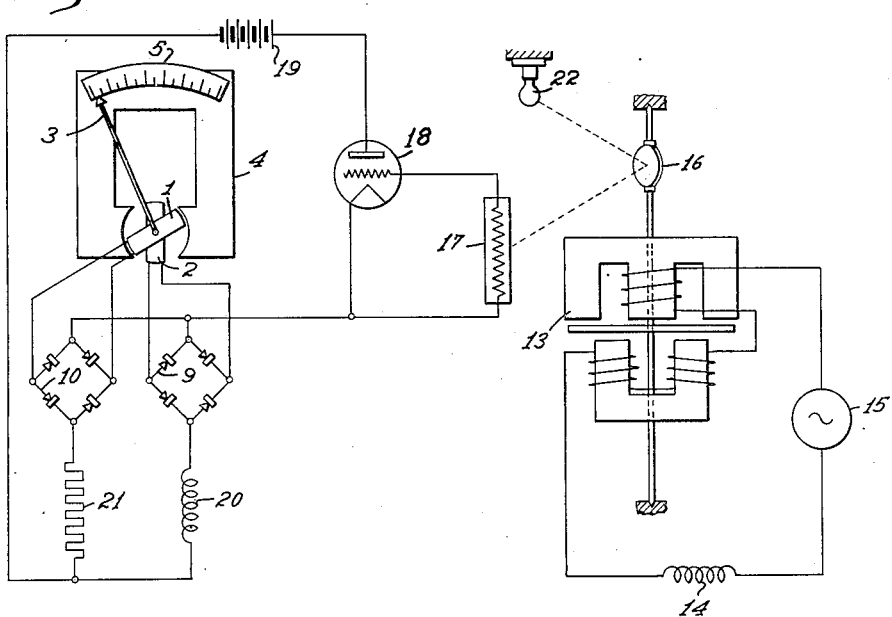

A diagram of connections of one form of the invention is shown in Fig. 1 of the accompanying drawing and a diagram of connections of another form is shown in Fig. 2 thereof.

Fig. 1 shows the well known moving coil type D. C. ratiometer which comprises two coils 1 and 2 rigidly coupled together and to a pointer 3 and movably mounted in an unsymmetrically distributed magnetic field produced by a permanent magnet 4 such that as one coil moves into a stronger field, the other moves into a weaker field. Pointer 3 moves over a graduated scale 5. Thus, if the ratio of the current in coil 1 to that in coil 2 increases, the coils and pointer will move in such a way that coil 1 moves into a weaker field and coil 2 into a stronger whereby the equal and opposite torques on the two coils are brought into equality, the position taken up by the pointer 3 over scale 5 depending thus on the ratio of the currents in the coils 1 and 2 and not on their absolute values. The coils usually move in an annular air gap which is of progressively varying radial width whereby the magnetic field across the gap progressively varies.

To indicate the speed of the rotary device 6 a synchronous generator of periodic currents is driven thereby and the periodic currents are applied to two circuits in parallel forming in combination with the above described ratiometer a frequency meter. One of these circuits is made up largely of the inductance 7 so that the current therein will vary substantially inversely to the frequency of the applied E. M. F. so that an increase in frequency will decrease the current. The other circuit consists mainly of the capacitor 8 so that the current therein will be substantially directly proportional to the frequency of the applied E. M. F. and an increase in frequency will increase the current. In series with the inductance 7 is connected a full wave rectifier 10 and the coil 2 of the ratiometer. In series with the capacitor 8 is connected the full wave rectifier 9 and the coil 1 of the ratiometer.

The generator of periodic currents at a frequency proportional to the speed of the device 6 consists of the combination of the source of D. C. supply 11 in series with the rotary interrupter 12 driven by the device 6.

When the arrangement is in operation current periodically intermittent at a frequency proportional to the speed of device 6 is supplied to the frequency meter. The ratio of the currents in the coils 1 and 2 will be proportional to this frequency and accordingly the pointer 3 will take up a position on the scale 5 depending upon the said speed, the scale being calibrated to indicate this speed. The arrangement has the advantage over other known speed-measuring devices that the permanent magnet moving coil ratiometer requires only a very small current consumption and furthermore the torque required to drive the interrupter 12 can be extremely small.

If it be desired to measure speed by placing an even smaller load on the device of which the speed is being measured, an arrangement shown in Fig. 2 can be used. This is shown as applied to the remote indication of electric current. An integrating ampere-hour-meter 13 is in series with the load circuit 14 and generator 15 in which the current is to be measured and accordingly the instantaneous speed of this meter is a measure of the current. The meter drives the generator of periodic currents which is shown as consisting of a revolving mirror 16 which reflects light from a source 22 periodically on to a photo electric cell 17 or other light-sensitive electric device associated with an amplifier 18 through which current is supplied to the frequency meter which is substantially as described with reference to Fig. 1. The source of supply for the output of the amplifier is indicated at 19. The parallel circuits shown in Fig. 2 differ from those shown in Fig. 1 in that while one of them is made up of a reactance 20 so that the current therein will be dependent on frequency, the other is a substantially non-reactive resistance 21 so that the current therein will be substantially independent of frequency. The operation, however, will be as already described. The position taken up by the pointer 3 on the scale 5 will again depend upon the speed of the device 13 and hence on the current through the load circuit 14, and the scale 5 is accordingly calibrated to indicate this current.

The small power required to be transmitted electrically in carrying out the invention allows of measurements to be transmitted, for example, over public telephone lines or other pilot wires where there are definite limits to the voltage and current permissible.

What I claim as my invention and desire to secure by Letters Patent is:

An electric tachometer comprising speed responsive means for providing synchronously varying current, a direct current ratiometer having speed indicating means and two coils for controlling said indicating means, a circuit connected to said speed-responsive means to be energized by said current and having two parallel branches, one of said circuit branches having substantially only an inductive impedance and the other having substantially only a non-inductive impedance so that the ratio of the two branch currents changes in accordance with the current frequency, and two rectifier means connecting said two circuit branches with said two coils respectively.

GEORGE FRANK TAGG.

REFERENCES CITED

The following references are of record in the file of this patent:

UNITED STATES PATENTS

| Number | Name | Date |
| --- | --- | --- |
| 1,055,911 | Hopkins | Mar. 11, 1913 |
| 1,663,086 | Long | Mar. 20, 1928 |
| 1,711,101 | Shanck | Apr. 30, 1929 |
| 1,878,658 | Aronoff | Sept. 20, 1932 |